United States Patent
Rajakumar

(10) Patent No.: US 7,245,455 B2
(45) Date of Patent: Jul. 17, 2007

(54) CENTER SPLIT FEATURE AND PRESSURIZATION FOR ALTITUDE INSENSITIVITY, HIGH PITCH TORQUE AND HIGH PRELOAD SENSITIVITY AIR BEARING SLIDER

(75) Inventor: Rajashankar Rajakumar, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 427 days.

(21) Appl. No.: 10/625,788

(22) Filed: Jul. 23, 2003

(65) Prior Publication Data

US 2004/0120075 A1   Jun. 24, 2004

Related U.S. Application Data

(60) Provisional application No. 60/423,823, filed on Nov. 5, 2002.

(51) Int. Cl.
*G11B 5/60* (2006.01)
(52) U.S. Cl. .................. 360/235.8; 360/236.3
(58) Field of Classification Search ............. 360/235.8, 360/236.3
See application file for complete search history.

(56) References Cited

U.S. PATENT DOCUMENTS

| | | | |
|---|---|---|---|
| 4,870,519 A | 9/1989 | White | |
| 5,299,079 A | 3/1994 | Kuroda | |
| 5,508,862 A * | 4/1996 | Lazzari et al. ........... | 360/236.4 |
| 5,606,476 A | 2/1997 | Chang et al. | |
| 5,704,715 A | 1/1998 | Chang et al. ................. | 384/12 |
| 6,072,662 A | 6/2000 | Utsunomiya | |
| 6,125,005 A | 9/2000 | Lee et al. | |
| 6,344,948 B1 | 2/2002 | Tang et al. .............. | 360/324.6 |
| 6,483,667 B1 * | 11/2002 | Berg et al. ............... | 360/235.6 |
| 6,556,381 B2 * | 4/2003 | Kohira et al. ............ | 360/236.3 |
| 6,678,119 B1 * | 1/2004 | Pendray et al. .......... | 360/236.6 |
| 6,738,227 B2 * | 5/2004 | Jang et al. ............... | 360/236.3 |
| 6,937,440 B2 * | 8/2005 | Rajakumar et al. ....... | 360/236.2 |
| 6,999,282 B2 * | 2/2006 | Rao .......................... | 360/236 |
| 7,009,813 B2 * | 3/2006 | Kang et al. .............. | 360/235.7 |
| 2001/0053046 A1 * | 12/2001 | Koishi ..................... | 360/236.2 |
| 2002/0008940 A1 * | 1/2002 | Jang et al. ............... | 360/236.3 |
| 2002/0075599 A1 * | 6/2002 | Rao et al. ................. | 360/235.7 |
| 2002/0159192 A1 * | 10/2002 | Wada et al. ............. | 360/235.8 |

(Continued)

*Primary Examiner*—Brian E. Miller
(74) *Attorney, Agent, or Firm*—Joseph R. Kelly; Westman, Champlin & Kelly, P.A.

(57) ABSTRACT

The present invention is directed to a bearing surface on a slider having a center split pressurization feature which minimizes the effects of altitude or change in ambient air pressure on the flying characteristics of the slider. After a cavity dam and a subambient pressurization cavity is the center split feature. The center split feature is located proximate the centroid of the slider body and the bearing surface. The center split feature has, at least, three levels including a first center split level a second center split level and a third center split level. The first center split level is at the same level as the bearing surface level and is located closest to the centroid. The second center split level is located forward of, in the direction of air flow, the first center split level. The second center split level is also recessed from the first center split level to the same level as the first recessed level. The third center split level is located forward of the second center split level and is recessed from the second center split level.

20 Claims, 11 Drawing Sheets

U.S. PATENT DOCUMENTS

2003/0039073 A1* 2/2003 Rao .................... 360/235.8
2003/0058578 A1* 3/2003 Boutaghou et al. ...... 360/235.8
2003/0197979 A1* 10/2003 Kohira et al. ............ 360/236.3
2004/0027723 A1* 2/2004 Ueda et al. .............. 360/235.7

* cited by examiner

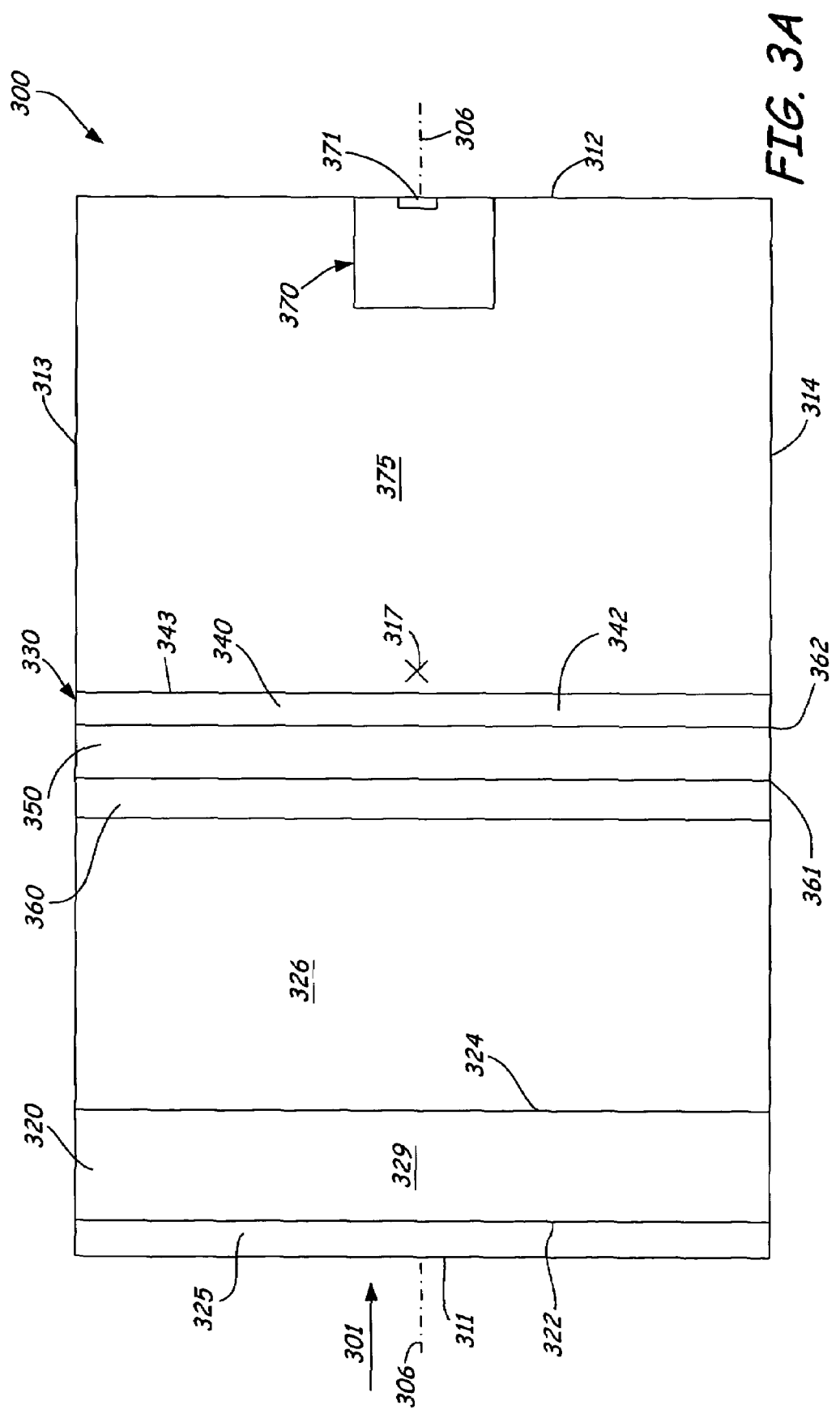

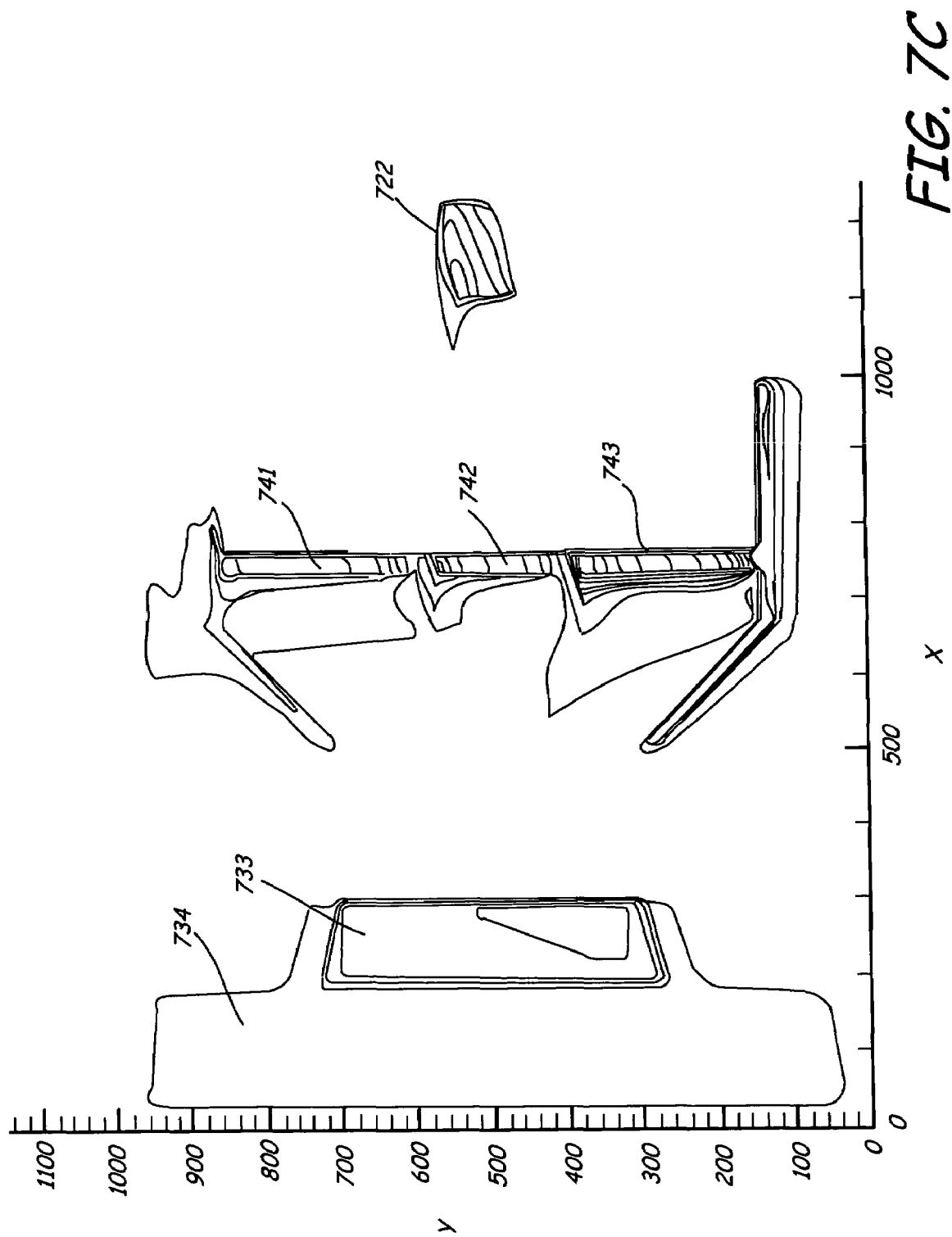

CENTER SPLIT FEATURE AND PRESSURIZATION FOR ALTITUDE INSENSITIVITY, HIGH PITCH TORQUE AND HIGH PRELOAD SENSITIVITY AIR BEARING SLIDER

CROSS-REFERENCE TO RELATED APPLICATION

This application claims priority from U.S. Provisional Application 60/423,823 filed on Nov. 5, 2002 for inventors Rajashankar Rajakumar and entitled CENTER SPLIT FEATURE AND PRESSURIZATION FOR ALTITUDE INSENSITIVITY, HIGH PITCH TORQUE AND HIGH PRELOAD SENSITIVITY AIR BEARING SLIDER.

FIELD OF THE INVENTION

The present invention relates generally to data storage systems, and more particularly but not by limitation to a disc head slider for communication with a recording medium.

BACKGROUND OF THE INVENTION

Disc drives of the "Winchester" and optical types are well-known in the industry. Such drives use rigid discs, which are coated with magnetizable medium for storage of digital information in a plurality of circular, concentric data tracks. The discs are mounted on a spindle motor, which causes the discs to spin and the surface of each disc to pass under a hydrodynamic bearing disc head slider. The slider typically carries a transducer, which writes information to and reads information from the disc surface. Typically, a single disc surface will have one disc head slider passing over the surface.

In a conventional disc drive, multiple discs are coupled to and rotate about a spindle. Each of the discs has two substantially flat surfaces that are capable of storing data. Typically these discs are stacked in a parallel relationship with each other. The sliders are designed to move within the space between the adjacent discs while flying in close proximity the disc surface. The slider is coupled to the distal end of a thin, arm-like structure called a head suspension assembly (HSA), which is inserted within the space between two adjacent discs.

The track accessing arm moves a slider or group of sliders from track to track across the surfaces of the disc. The track accessing arm typically includes a head gimbal assembly, a load beam, an actuation component to move the track accessing arm, and a read/write head and slider supported by the head gimbal assembly. The load beam provides a load force which encourages the slider towards the disc surface. A gimbal is positioned between the slider and the load beam, or is integrated into the load beam, and provides a resilient connection that allows the slider to pitch and roll while following the typography of the disc.

The slider typically includes a bearing surface which faces the disc surface. As the disc rotates, air is drug underneath the slider by the disc and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force which counteracts the load force and causes the slider to lift or "fly" above or in close proximity to the disc surface.

One type of slider is a "self-loading" air-bearing slider, which includes a leading taper, a pair of raised side-rails, a cavity dam and a subambient pressurization cavity. The leading taper is typically lapped or etched onto the end of the slider that is opposite the read/write head. The leading taper pressurizes the air as the air is dragged under the slider by the disc surface. An additional effect of the leading taper is that the pressure distribution under the slider has a first peak near the tapered end or "leading edge" due to high compression angle of the taper step, and a second peak near the read/write head or "trailing edge" due to a low bearing clearance necessary for efficient magnet recording. This dual peak pressure distribution results in a bearing with a relatively high pitch stiffness.

The bearing clearance between the slider and the disc surface at the read/write head is an important parameter to disc drive performance. As average flying heights continue to be reduced, altitude induced and manufacturing variation induced fly height loss are an increasing source of head contact and modulation that lead to read/write failures. In addition, variation in slider shape (i.e. crown and cross curvature) also lead to unwanted head/disc contact.

Further, there is a tendency for the slider to change both its pitch angle and its fly height as the ambient air pressure around the disc surface changes as a result of altitude changes to the drive. This change in flying characteristics of the slider can result in the head crashing into the surface of the disc, causing damage to the information contained on the data surface. Prior art sliders have used lap pads or diamond-like carbon (DLC) pads to account for this change in fly height as well as to reduce the stiction force associated with the slider contacting the disc surface. A typical slider without pads is typically designed to fly at a pitch angle of approximately 160 micro radians. When the slider is fitted with pads, the slope of the pitch angle is increased to approximately 220 micro radians. This increased slope created by the pads results in a high pitch offset and an increased sensitivity to ambient pressure changes.

The flying characteristics of the slider are typically controlled by variations in the pressurization over the surface of the slider. A slider typically experiences areas of positive pressure and areas of negative pressure. The areas of positive pressure tend to cause the slider to rise above the surface of the disc. Whereas, areas of negative pressure tend to cause the slider to move towards the surface of the disc. By balancing these pressurization areas a slider designer is able to control the flying characteristics of the slider. Typically, disc sliders have a positive pressure area at the leading edge and at the trailing edge or near these regions. Some sliders also have a positive pressure area along the side edges. Sliders commonly have a cavity dam after the leading edge pressurization feature which creates an area negative pressure to help offset the positive pressure force generated by the leading edge feature, and to encourage the slider towards the disc surface while maintaining the designed pitch angle. However, when the altitude of a slider is increased, for example, by taking the drive up in an airplane, the pressure differential generated by these two areas of pressure is often not enough to maintain the designed flying characteristics. Therefore, a slider design is desired which minimizes the sensitivity of the slider to altitude.

Embodiments of the present invention provide solutions to these and other problems, and offer other advantages over the prior art.

SUMMARY OF THE INVENTION

One embodiment of the present invention is directed to an air bearing surface on a slider having a center split pressurization feature which minimizes the effects of altitude or change in ambient air pressure on the flying characteristics of the slider. The slider includes a leading edge, a trailing edge, an air bearing surface and a centroid. The slider also includes a center pad supporting a transducer is located proximate the trailing edge.

The air bearing surface is divided into a series of levels including an ABS level, a first recessed level and a second recessed level. The first recessed level is recessed below the ABS level. The second recessed level is recessed below the first recessed level. The ABS surface also can include a cavity dam disposed proximate to the leading edge of the slider. The cavity dam includes a disc facing surface that is raised above the first recessed level. Following the cavity dam is a subambient pressurization cavity. After the cavity dam and the subambient pressurization cavity is the center split feature. In other embodiments the air bearing surface can include additional pressurization features such as side rails or a center rail.

The center split feature is located proximate the centroid of the slider body and the air bearing surface. The center split feature has, at least, three levels including a first center split level, a second center split level, and a third center split level. The first center split level is at the same level as the ABS level and is located closest to the centroid. The second center split level is located forward of, in the direction of air flow, the first center split level. The second center split level is also recessed from the first center split level to the same level as the first recessed level. The third center split level is located forward of the second center split level and is recessed from the second center split level. In some embodiments the third center split level is recessed to the second recessed level which is the same depth as the subambient pressurization cavity.

A second embodiment of the present invention is directed towards a disc drive. The disc drive, has a data storage disc, a suspension, and a slider. The slider is supported by the suspension and has a slider body, a leading slider edge, a trailing slider edge, a recessed area and a positive pressurization area formed on the media opposing face. The slider also includes an air bearing surface disposed on the disc opposing face that includes a center split feature, disposed proximate a centroid, of the slider body. The center split feature, includes a first center split level, a second center split level recessed from the first center split level, and a third center split level recessed from the second center split level. The first, second and third center split levels form a step like pattern. The levels are arranged such that air flowing over the center split feature flows over the third, second and first center split levels in that order.

Other features and benefits that characterize embodiments of the present invention will be apparent upon reading the following detailed description and review of the associated drawings.

BRIEF DESCRIPTION OF THE DRAWINGS

FIG. 3A is a bottom plan view of a simplified air bearing design for a slider including the center split feature of the present invention.

FIGS. 7A-7C are pressurization contours for different air bearing surfaces according to illustrative embodiments of the present invention.

DETAILED DESCRIPTION OF ILLUSTRATIVE EMBODIMENTS

Figure 1:
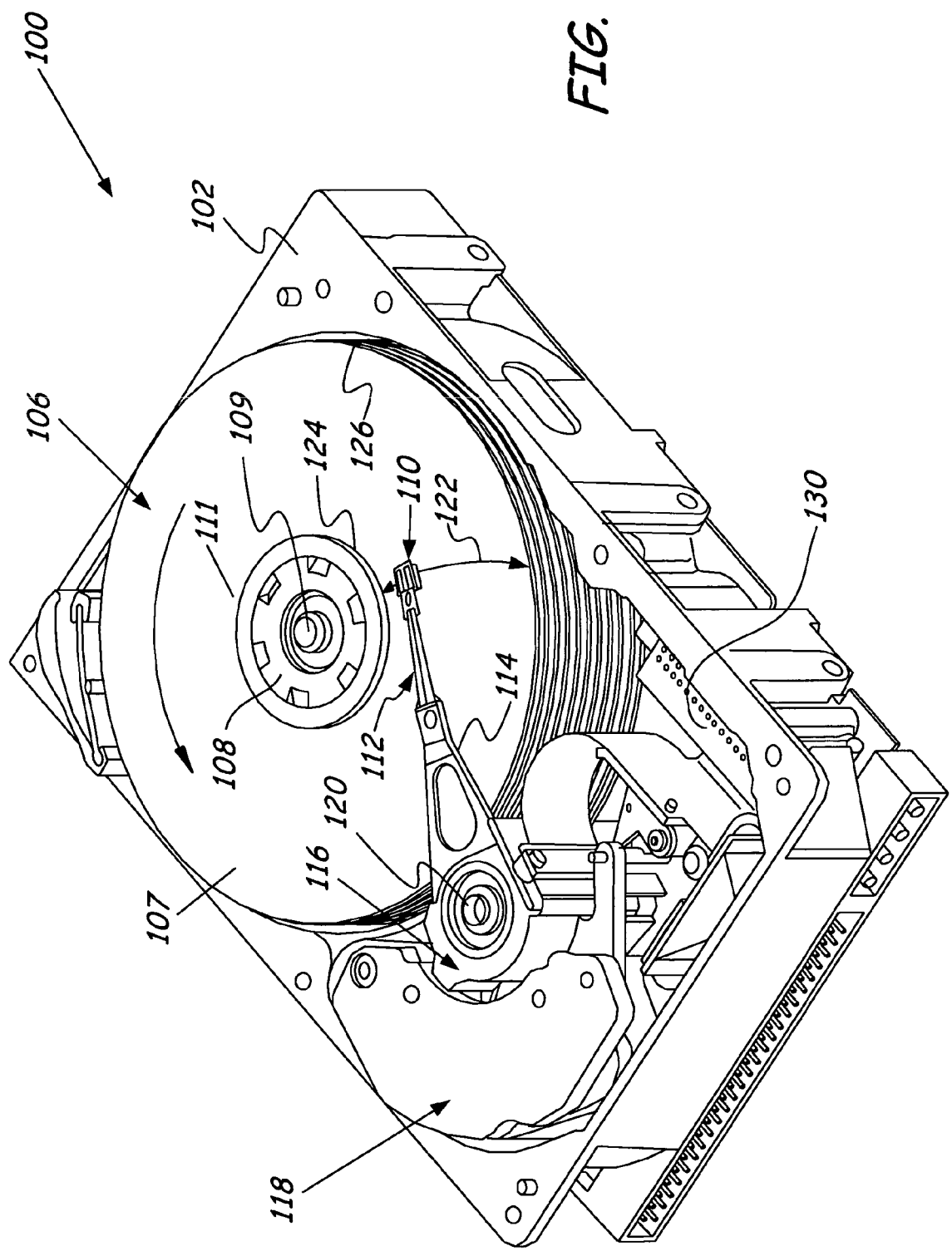
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2A:
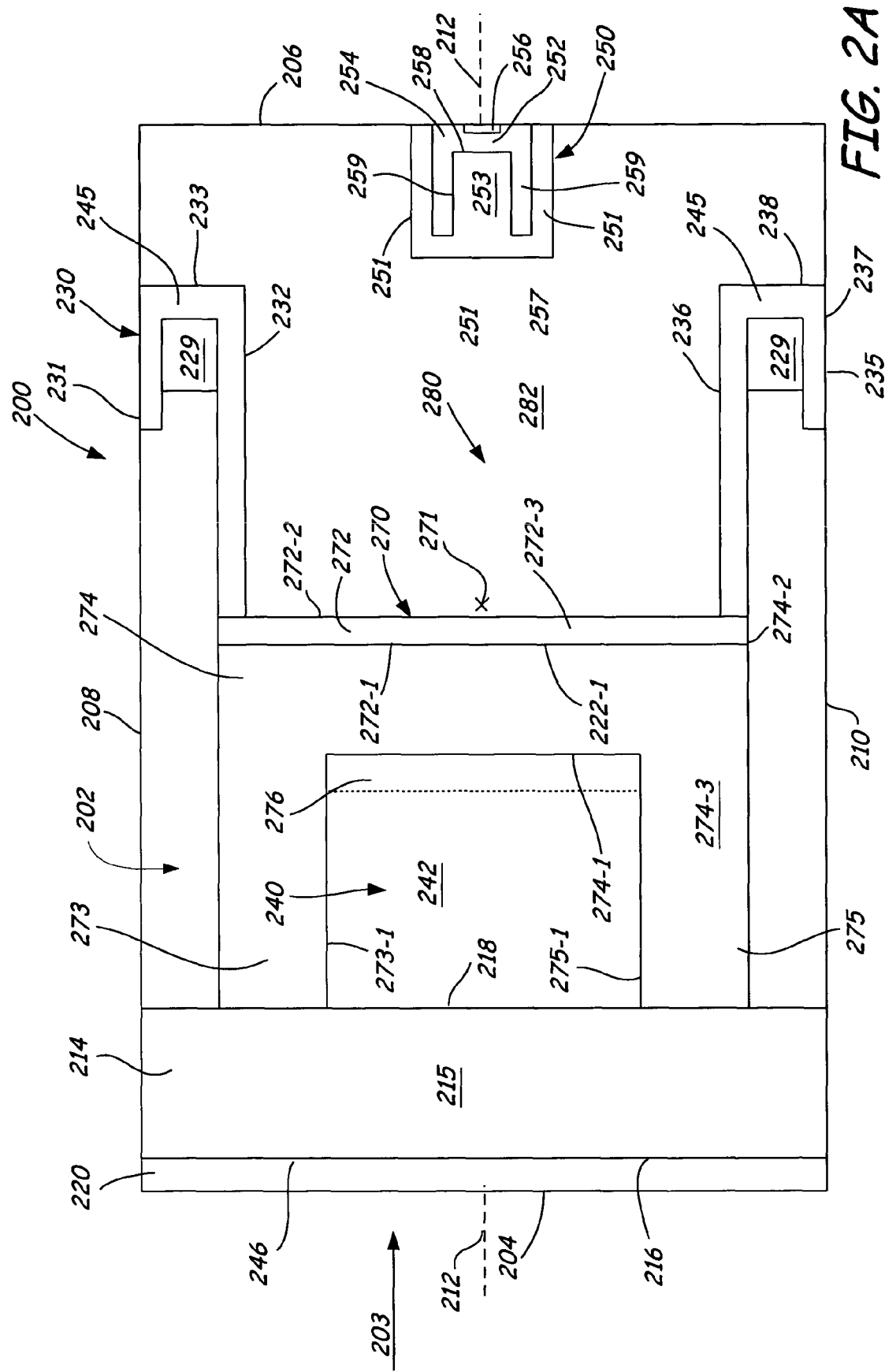
FIG. 2A is a bottom plan view of a slider according to one embodiment
Figure 2B:
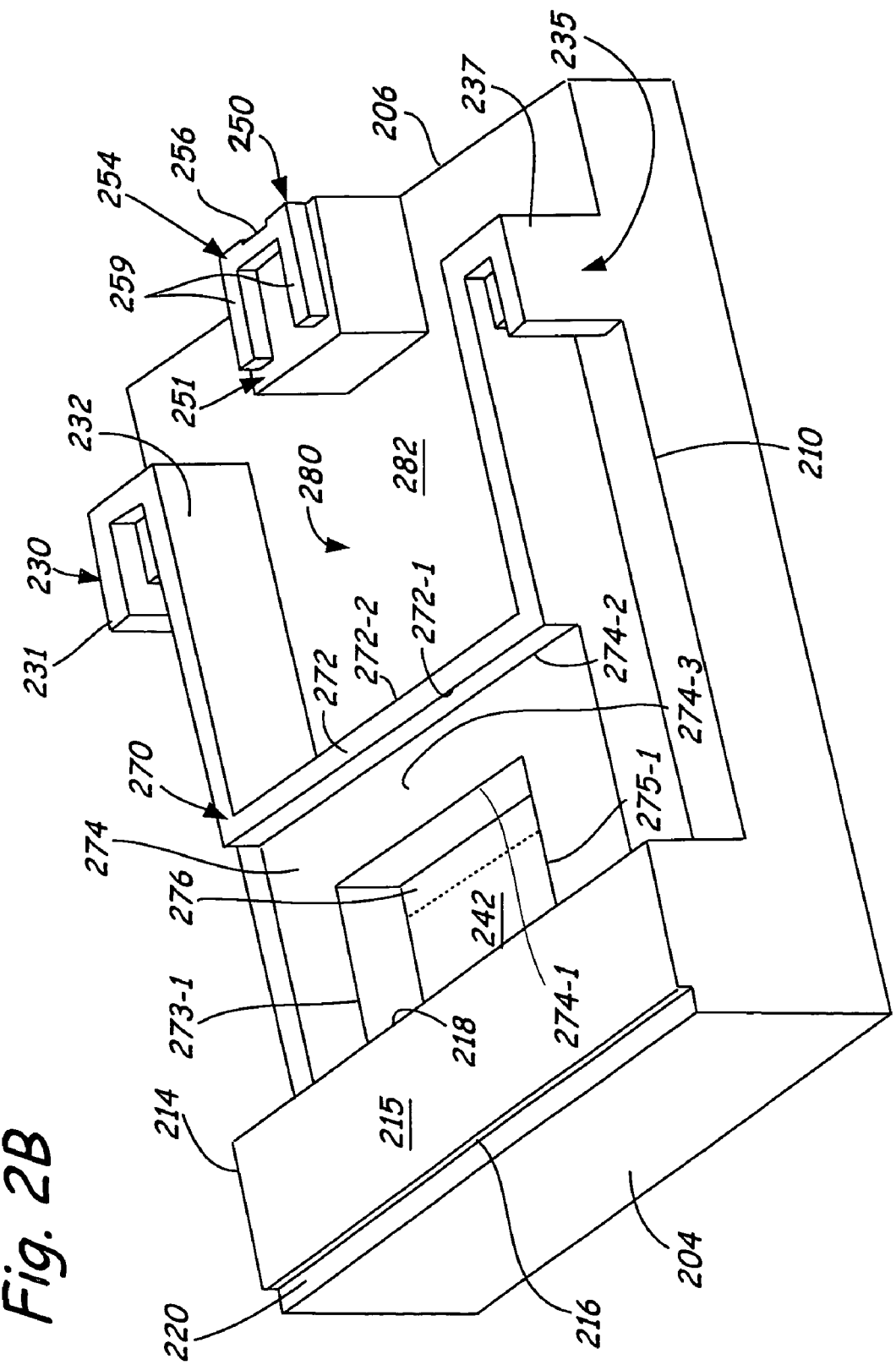
FIG. 2B is a perspective view of the slider in FIG. 2A.

FIG. 2A is a bottom plan view illustrating one of the sliders 110 illustrated in FIG. 1, as viewed from the surface 107 of disc 106, according to one embodiment of the present invention. FIG. 2B is a perspective view of the slider 200 illustrated in FIG. 2A. Slider 200 includes a cavity dam 214, a first side rail 230, a second side rail 235, a center pad 250 and a center split pressurization feature 270.

Slider 200 has a disc facing side 201, which includes a bearing surface 202. Bearing surface 202 is a reference level for disc facing side 201 from which other surface levels are recessed, raised, tilted or tapered. Surfaces forming bearing surface 202 generally lie in a bearing plane. Slider 200 may be fabricated with a crown or cross curvature in its length and/or width directions. References made to relative surface depth and angles may reflect this crown and cross curvature. Slider 200 includes a slider leading edge 204, a slider trailing edge 206, slider side edges 208 and 210, and a lateral centerline 212.

The cavity dam 214 extends between side edges 208 and 210, and is arranged generally along slider leader edge 204. Cavity dam 214 also has a leading edge 216 and a trailing edge 218. In one embodiment, the upper surface 215 of cavity dam 214 is generally coplanar with and defines a portion of the bearing surface 202. However, other arrangements for cavity dam 214 can be used.

A step surface 220 is formed along the leading edge 216 of cavity dam 214. The step surface 220 is recessed from the bearing surface 202 by a substantially constant step depth. In one embodiment, the step depth can be in the range of about 0.1 microns to about 0.3 microns. This is in order to provide pressurization for the bearing surface 202 at the cavity dam 214. However, other step depths can also be used. In another embodiment, the step surface 220 has a step depth relative to the bearing plane that gradually decreases from slider leading edge 204 to the leading edge 216 of cavity dam 214. Step surface 220 can be formed by any method such ion milling, reactive ion etching (RIE) or lapping. In one embodiment, step surface 220 is formed by ion milling through a gray scale photolithography mask that allows multiple depths to be etched with a single mask. The step surface 220 serves to pressurize air as the air is dragged under slider 200 by the rotating disc 106. An additional effect of the step surface 220 is to create a first pressure peak near the leading edge 204 in the pressure distribution profile under slider 200. Step surface 220 can also include raised portions that assist in blocking particles from entering the space between the disc 106 and the slider 200.

Center split pressurization feature 270 is located near a centroid 271 on the slider 200. The centroid 271, as illustrated in FIG. 2, is the center of the surface of slider 200. However, those skilled in the art will appreciate that the centroid 271 can be a center of pressure, a center of gravity, or other center location on slider 200. Center split 270 causes air flowing in a first subambient pressurization cavity 240 to rise over the center split feature 270, thus causing an area of positive pressurization to form over the center split feature 270. Center split 270 includes a first center split level 272, a second center split level 274, and a third center split level 276.

Figure 6:
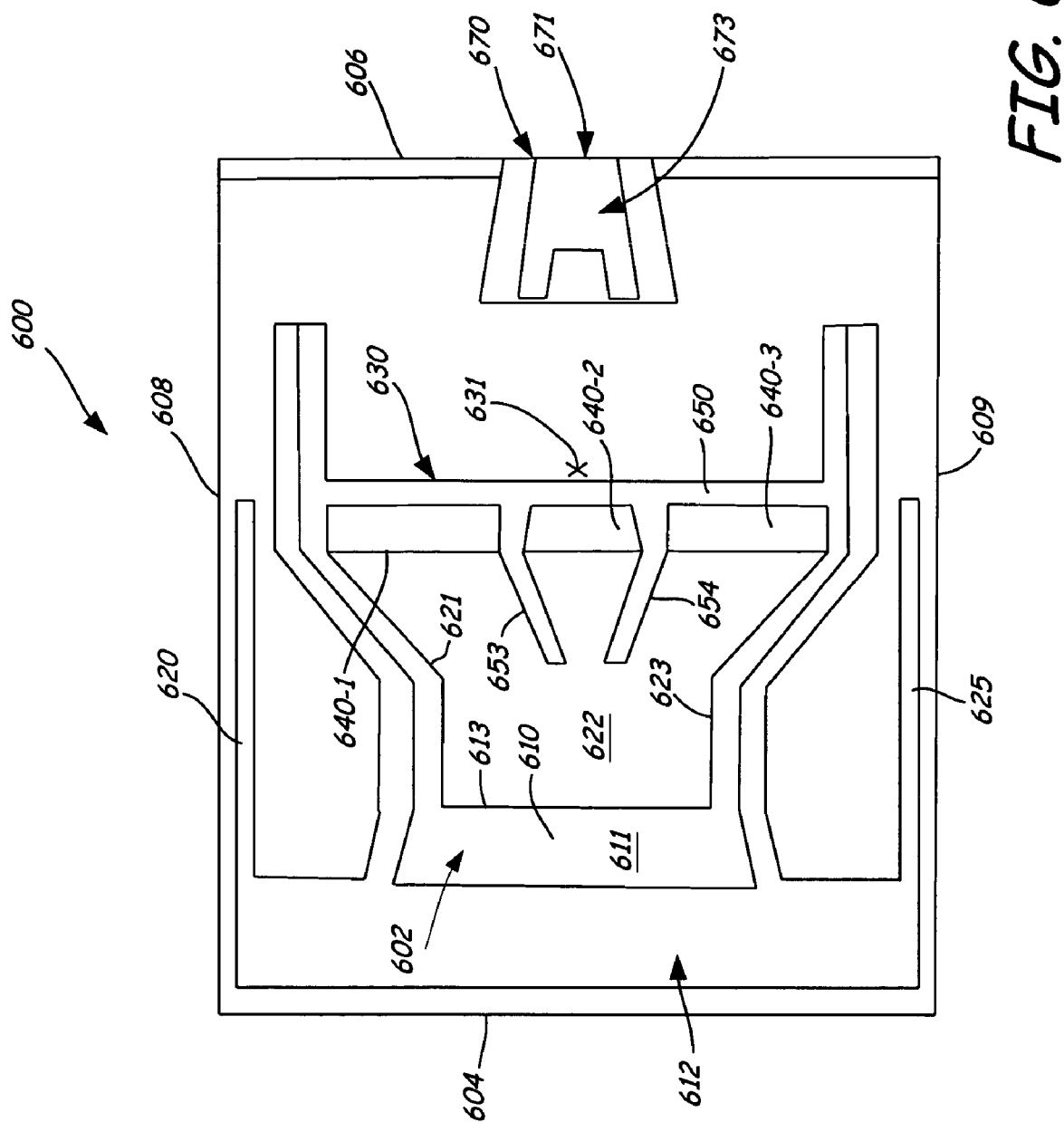
FIG. 6 is a bottom plan view of a slider including a multiple center split feature arranged proximate to a centroid.

In the embodiment illustrated in FIGS. 2A and 2B, center split feature 270 is shown generally parallel to the slider leading edge 204. Center split 270 is also illustrated spanning or covering a portion of the overall width of the slider 200. However, those skilled in the art will appreciate that center split feature 270 can extend from side edge 208 to side edge 210, or that center split feature 270 can span less than the width of slider 200 illustrated in FIGS. 2A and 2B. Furthermore, center split feature 270 can be divided into multiple center split features that are arranged around the centroid 271, as illustrated in FIG. 6.

First center split level 272 is generally coplanar with the upper surface 215 of cavity dam 214 and the bearing surface 202. The first center split level 272 includes a leading edge 272-1, a trailing edge 272-2 and a first center split level surface 272-3. However, depending on the pressurization profile desired, the first center split level 272 can be either raised above or recessed below the bearing surface 202. Furthermore, surface 272-3 can also be angled or tilted relative to the bearing surface.

Second center split level 274 is located forward of the first center split level 272, that is the second center split level 274 is in contact with the first center split level 272 along the first center split level leading edge 272-1, which faces slider leading edge 204 and cavity dam 214. Second center split level 274 includes a leading edge 274-1, a trailing edge 274-2 and a second center split level surface 274-3. Surface 274-3 is recessed from the first center split level 272-3 by step depth. In one embodiment, the step depth is between 0.1 microns and 0.3 microns. However, depending on the pressurization profile desired other step depths can be used. In the embodiment illustrated in FIGS. 2A and 2B, the second center split level 274 extends from cavity dam 214 to the first center split level 272. Arms 273 and 275 of second center split level 274 form two side walls 273-1 and 275-1 which partially define the sub-ambient pressurization cavity 240. This arrangement allows for more air to enter or flow over center split feature 270 than would be possible when traditional side rails are present. Further, this arrangement reduces the side positive pressure profile generated by traditional side rails.

Third center split level 276 is located forward of the leading edge 274-1 of the second center split level 274. The third center split level 276 is recessed from the second center split level 274 and the first center split level 272 by a cavity depth. In one embodiment, this cavity depth is between 2.0 and 5.0 microns. However, depending on the desired pressurization profile other cavity depths can be used. It should be noted, that the cavity depth is measured from the bearing surface 202, and not from the second center split level surface 274-3. In the embodiment illustrated in FIG. 2, the third center split level 276 is recessed to the same depth as the cavity floor 242 of the first subambient pressurization cavity 240. In this arrangement, a portion of the first subambient pressurization cavity 240 includes the third center split level 276.

The first subambient pressurization cavity 240 is defined between cavity dam 214 and center split 270. First subambient pressurization cavity 240 is a recessed area having a cavity floor 242, which is recessed from the bearing surface 202 by cavity depth, which is greater than the width depth of step 220. In one embodiment, the cavity depth is between the range of about 1.0 micron to about 5.0 microns. However, other cavity depths can also be used.

First subambient pressurization cavity 240 trails the cavity dam 214 relative to a direction of air flow from slider leading edge 204 towards slider trailing edge 206. This air flow is indicated by arrow 203. As explained above, arms 273 and 275 define the cavity 240 and isolate the cavity 240 from the ambient pressure along slider side edges 208 and 210. However, other fluids can be used between the disc surface, and the head.

Following, in the direction of air flow 203, center split pressurization feature 270 is a second subambient pressurization feature cavity 280. The second subambient pressurization cavity 280 is a recessed area having a cavity floor 282 which is recessed from the bearing surface 202 by a cavity depth. In one embodiment, this cavity depth is between about 2.0 microns and about 5.0 microns and is the same depth as the cavity depth of subambient pressurization cavity 240. However, other cavity depths can also be used. Furthermore, depending one the desired pressurization profile of the slider 200 cavity 280 can have a depth that is not the same as cavity 240.

Second subambient pressurization cavity 280 trails center split feature 270 relative to the direction of the air flow 203. First side rail 230 and a second side rail 235 define the cavity and isolate the cavity 280 from the ambient pressure along slider side edges 208 and 210.

First side rail 230 is positioned along slider side edge 208, second side rail 235 is positioned along slider side edge 210. First side rail 230 includes an outside wall 231, an inside wall 232 and a trailing wall 233. Similarly, second side rail 235 includes an inside wall 236, an outside wall 237 and a trailing wall 238. Inside wall 232 extends from trailing wall 233 to center split 270, while outside wall 231 extends from trailing wall 233 towards center split 270 and provides an opening 234 to allow air flow access to trailing wall 233. Inside wall 236 extends from trailing wall 238 to center split 270, while outside wall 237 extends from trailing wall 238 and defines an opening 239 to allow airflow access to trailing wall 238. Side rails 230 and 235 can also include step surface 229 which provides additional pressurization near the trailing walls. Side rails 230 and 235 can also include bearing surfaces 245 and convergent channel features 246. Bearing surfaces 245 are generally coplanar with the upper surface of cavity dam 214, center split 270 and bearing surface 202.

Center pad 250 is positioned along slider trailing edge 206. Center pad 250 is also positioned along lateral center line 212. However, those skilled in the art will recognize that center pad 250 can be skewed or offset with respect to center line 212 or to trailing edge 206.

Center pad 250 has leading and side step surfaces 251, a bearing surface 252 and a convergent channel feature 254. Bearing surface 252 is generally coplanar with the upper surface 215 of cavity dam 214, center split 270 and the bearing plane 202. Leading and side step surfaces 251 are generally parallel to and recessed from bearing surface 252 by a step depth. In one embodiment this step depth is between 0.1 microns and 0.3 microns. However, other step depths can be used. This depth provides for pressurization of the bearing surface 252 from air flow venting from subambient pressurization cavity 280. Center pad 250 supports a read/write transducer 256 along slider trailing edge 206. However, transducer 256 can be positioned at other locations on center pad 250. When transducer 256 is placed at or near slider trailing edge 206, transducer 256 is located at a point on slider 200 that is closest to the surface 107 of disc 106, when slider 200 is flying with a positive pitch angle. Further, when slider 200 is flying with a positive pitch angle, the slider trailing edge 206 is closer to the surface 107 of the disc 106 than the slider leading edge 204. The center pad illustrated in FIGS. 2A and 2B is but one of a myriad of center pad designs that can be used with the present invention.

Channel 254 includes a leading channel end or inlet 257, a channel trailing end or outlet 258, side walls 259 and a channel floor 253. Channel 254 can also be formed through photolithography processing such as ion milling, chemical etching or reactive ion etching. Alternatively, channel 254 can be formed along with rails 230 and 235 and pad 250 through an additive process such as material deposition.

Leading channel end 257 of channel 254 is open to fluid flow from cavity 280. Trailing channel end 258 is closed to the fluid flow. Once fluid flow enters channel 254, the flow is essentially bounded by channel side wall 259 and channel trailing end 258. The fluid flow is forced to rise over trailing channel end 258 thus forming a convergent channel. This creates localized pressure areas at discrete region of bearing surface 252 just rearward of channel trailing end 258. In one embodiment, these discrete regions have surface areas rearward of channel trailing end 258 that are at least as long as the width of the channel as measured between side walls 259 to provide sufficient surface area on which the localized pressure gradients can act. These channels can be symmetrical about lateral centerline 212 as illustrated in FIG. 2A, or can be asymmetrical to provide preferential pressurization in certain slider skew angles.

The localized positive pressure gradient developed along bearing surfaces 252 assist in providing pitch and roll stiffness to slider 200 and provides energy dissipation mechanism during slider vibration, which dampens the leading edge pitch and roll mode-type vibrations to the slider's natural resonance frequencies. Leading edge pitch mode type vibration refers to rotation about a line near the leading edge of slider 200 whereas trailing edge pitch mode refers to rotation about a line near the trailing edge of the slider 200. Roll mode type vibrations refer to rotation about the slider's lateral centerline 212. Similar aerodynamic results occur as air flows over side rails 230 and 235.

Air or fluid flow flowing over center split pressurization feature 270 assists in improving the slider's 200 flying characteristics by maintaining constant fly height characteristics regardless of the outside ambient pressure. A reduction in ambient pressure may be due to an increase in altitude by the slider such as when used on an airplane or a simple change in the pressure due to the weather. The air flowing over the center split feature pressurization 270 assists in minimizing the effects of the pressure drop experienced by the slider, and assists in maintaining a pressure balance between the slider leading edge 204 and slider trailing edge 206. Center split feature 270 also minimizes the lift loss at the trailing edge 206 and pitch angle losses that commonly occur due to an increase in altitude. This result occurs because the positive pressure generated over center split feature 270 provides an additional aerodynamic lift to the slider. This additional lift assists in preventing pitch loss and in maintaining constant fly height characteristics.

Figure 3B:
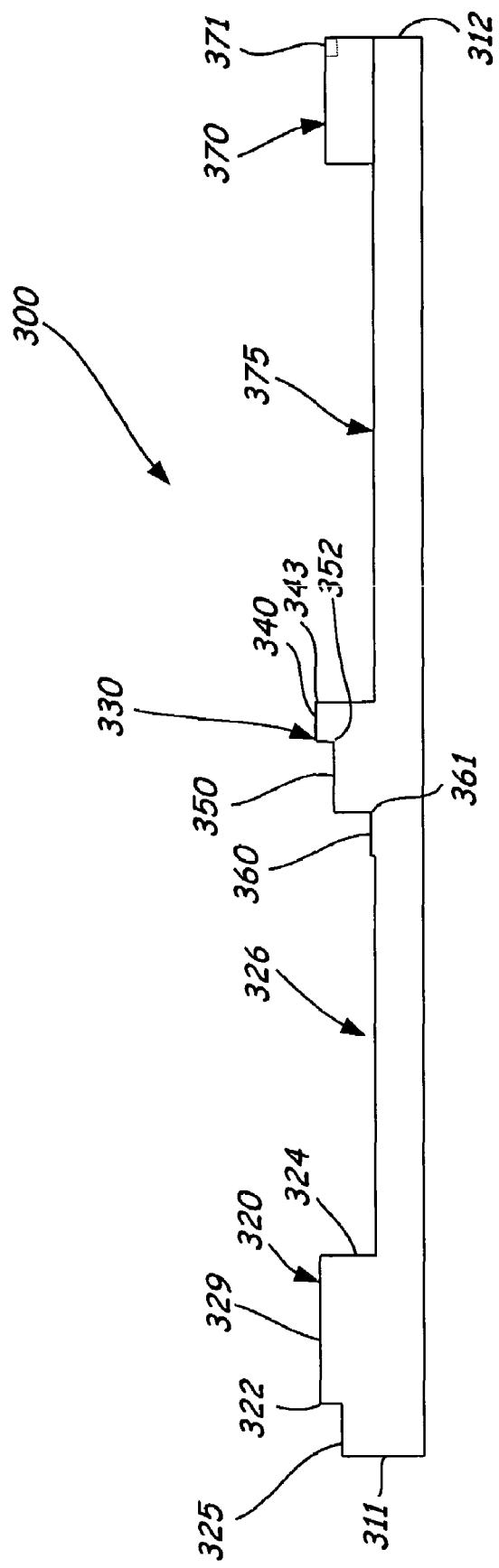
FIG. 3B is a side plan view of a simplified air bearing design for a slider including the center split feature of the present invention.

FIGS. 3A and 3B illustrate a simplified air bearing design for a slider 300 which includes the center split feature of the present invention. Slider 300 includes a first pressurization feature 320, a center split pressurization feature 330 and a center pad 370. Slider 300 has a slider leading edge 311, a slider trailing edge 312, a first side edge 313 and a second side edge 314.

The first pressurization feature 320 is located proximate to the slider leading edge 311. First pressurization area 320 extends between side edges 313 and 314, along leading edge 311. First pressurization area 320 includes a leading edge 322 and a trailing edge 324. First pressurization area 320 further includes an upper surface 329 which defines a portion of a bearing surface for slider 300. A leading step surface 325 extends along leading slider edge 311, forward of leading edge 322 of first pressurization area 320. Leading step surface 325 is recessed from the upper surface 329 of first pressurization area 320 by a step depth. In one embodiment, leading step surface 325 is generally parallel to upper surface 329. Alternatively, leading step surface 325 can also be formed as a leading taper. However, other shapes can be used for leading step surface 325. First pressurization feature 320 generates an area of positive pressure as air flowing in the direction of arrow 301 flows over first pressurization area 320. Following the trailing edge 324 in the direction of air flow from the first pressurization area 320 is a recessed portion of the slider body 300. This recessed portion 326 is recessed from the bearing surface by a recess depth of approximately 1.0 microns to 5.0 microns. However, other depths can be used.

The recessed portion 326 extends towards the trailing edge 312 of slider 310 until it reaches the center split feature 330, which is located proximate to a centroid 317 of slider 300. Center split feature 330 includes a first center split level 340, a second center split level 350 and a third center split level 360. Air or fluid flowing over the slider 300 encounters each of the center split levels.

The third center split level 360 is located closest to first pressurization feature 320 and is the first level of the center split feature 330 that is encountered by the fluid flow. In the embodiment illustrated in FIGS. 3A and 3B, the third center split level 360 is recessed from the bearing surface to a depth that is nearly identical to the depth of the recessed portion 326. However, third center split level 360 can be recessed to other depths. Alternatively, third center split level 360 can be part of the recess portion 326. At the trailing edge 361 of third center split level 360, the center split feature 330 rises from the third center split level 360 to a second center split depth, and forms the second center split level 350.

The second center split level 350 is also recessed from the bearing surface. In the embodiment illustrated in FIGS. 3A and 3B the second center split level 350 is recessed from the bearing surface by a depth of approximately 0.3 microns. However, depending on the configuration and desired pressurization profile other depths can be used. At a trailing edge 352 of the second center split feature 350, the center split further rises to the first center split level 340. In the embodiment illustrated in FIGS. 3A and 3B, the first center split level 340 includes a surface level 342 which is at the same level as the bearing surface and the first pressurization area 329. However, this level 342 can be raised above or recessed below the bearing surface. As is clearly illustrated in FIG. 3B the levels 340, 350 and 360 that form a center split pressurization feature 330 have a profile that is generally stepped shaped. While the profile shown in FIG. 3B is step like, those skilled in the art will realize that center split feature 330 can have other shapes that are not exactly stepped shaped. However, in order for the pressurization effects caused by the fluid flowing over the center split feature to minimize the effects of altitude variation as well as to maintain the flying characteristics, center split feature 330 should include at least two different levels.

Following the center split feature 330 and in the direction of air flow 301 at the trailing edge 343 of first center split level 340 the surface of slider 300 once again recesses back down to a second recessed depth and forms a second recessed portion 375. This second recessed portion 375 can be recessed to a depth that is equal to the recess of the first recessed portion 326 or it can be recessed to other depths.

Proximate the trailing edge 312 of slider 300 is disposed a center pad feature 370. Center pad 370 is located on the lateral center line 306, and contains a read/write head or transducer 371 for accessing data contained on tracks on disc 106. While center pad 370 is illustrated in FIG. 3A as being symmetrical about the lateral center line 306 those skilled in the art will realize that center pad 370 can be offset or skewed from lateral center line 306.

Figure 4:
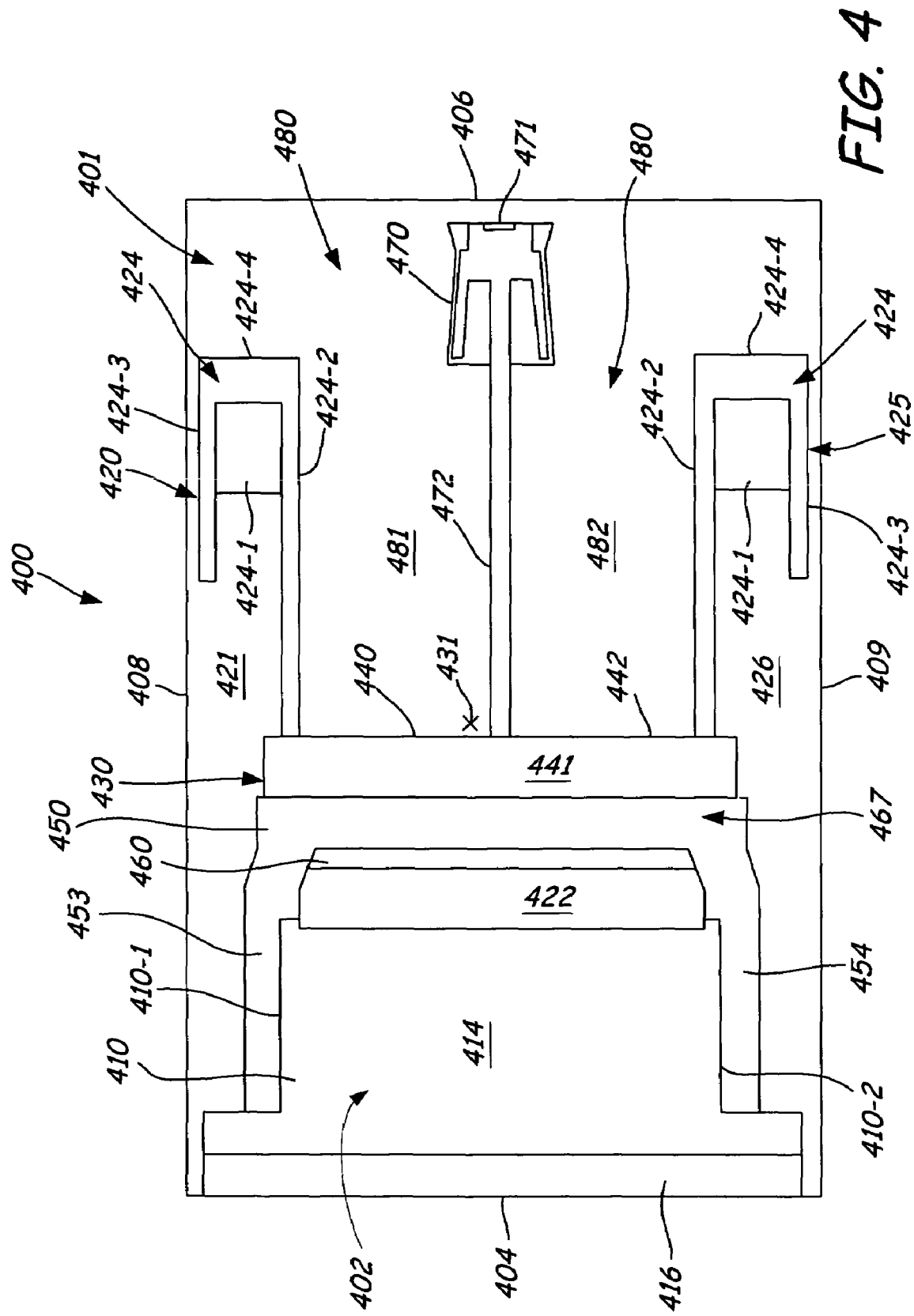
FIG. 4 is a bottom plan view of a slider according to one alternative embodiment of the present invention.

FIG. 4 illustrates a slider 400 according to one alternative embodiment of the present invention. Slider 400 includes a disc facing surface 401 and a bearing surface 402. Slider 400 has a sliding leading edge 404, a slider trailing edge 406 and slider side edges 408 and 409. The disc facing surface 401 includes a cavity dam 410, side rails 420 and 425, a center split pressurization feature 430 and a center pad 470.

Cavity dam 410 also features a step surface 416 which is proximate the leading edge 404 of the slider 400 and is recessed from surface 414 by a step depth. A subambient pressurization cavity 422 trails cavity dam 410 in a position between arms 453 and 454 of second center split level 440 of center split feature 430. A second subambient pressurization cavity 480 trails center split pressurization feature 430 and is positioned between side rails 420 and 425. Second subambient pressurization cavity 480 is separated by a center rail 472 into cavity regions 481 and 482. A first recessed area 421 extends along side edge 408 and a second recessed area 426 extends along side edge 409.

Side rail 420 includes a convergent channel feature 424. The convergent channel feature is isolated from the subambient pressurization cavity 480 and is open to recess area 421. Side rail 420 also includes a step portion 424-1 an inside side wall 424-2, an outside wall 424-3, and a trailing wall 414-4. Inside wall 424-2 separates the step surface 424-1 from the subambient pressurization cavity 480. In one embodiment in step portion 424-1 is recessed from the inside wall 424-2 by step depth of 0.1 to 0.5 microns. Similar features to those find in side rail 420 are present in side rail 425.

Center split feature 430 includes a first center split level 440, a second center split level 450 and a third center split level 460. Center split feature 430 is disposed proximate a centroid 431 of slider 400. The second center split level 450 includes center split arms 453 and 454 which are recessed from the first center split level 440 by a step depth. Arms 453 and 454 connect to side edges 410-1 and 410-2 of cavity dam 410. Further, arms 453 and 454 assist in defining the first subambient pressurization cavity 422. The surface 441 of first center split level 440 is generally parallel with and at the same level as the upper surface of cavity dam 414 and the bearing surface 402, while the surface of third center split level 460 is generally parallel to the cavity 422.

Connected to the trailing edge 442 of first center split level 440 is center rail 472. Center rail 472 separates or divides a second subambient pressurization cavity 480 into two separate cavities 481 and 482. Center rail 472 has a height that is generally parallel with and equal to the height of the upper surface of cavity dam 414 and of surface 441 of center split level 440. However, other heights for center rail 472 can be used. Center rail 472 extends along lateral center line 403, until center rail 472 connects with center paid 470.

Center pad 470 is located proximate to the trailing edge 406 of slider 400. Center pad 470 contains a read/write head or transducer 471, which can read data from or write data to tracks contained on disc surface 107.

Figure 5:
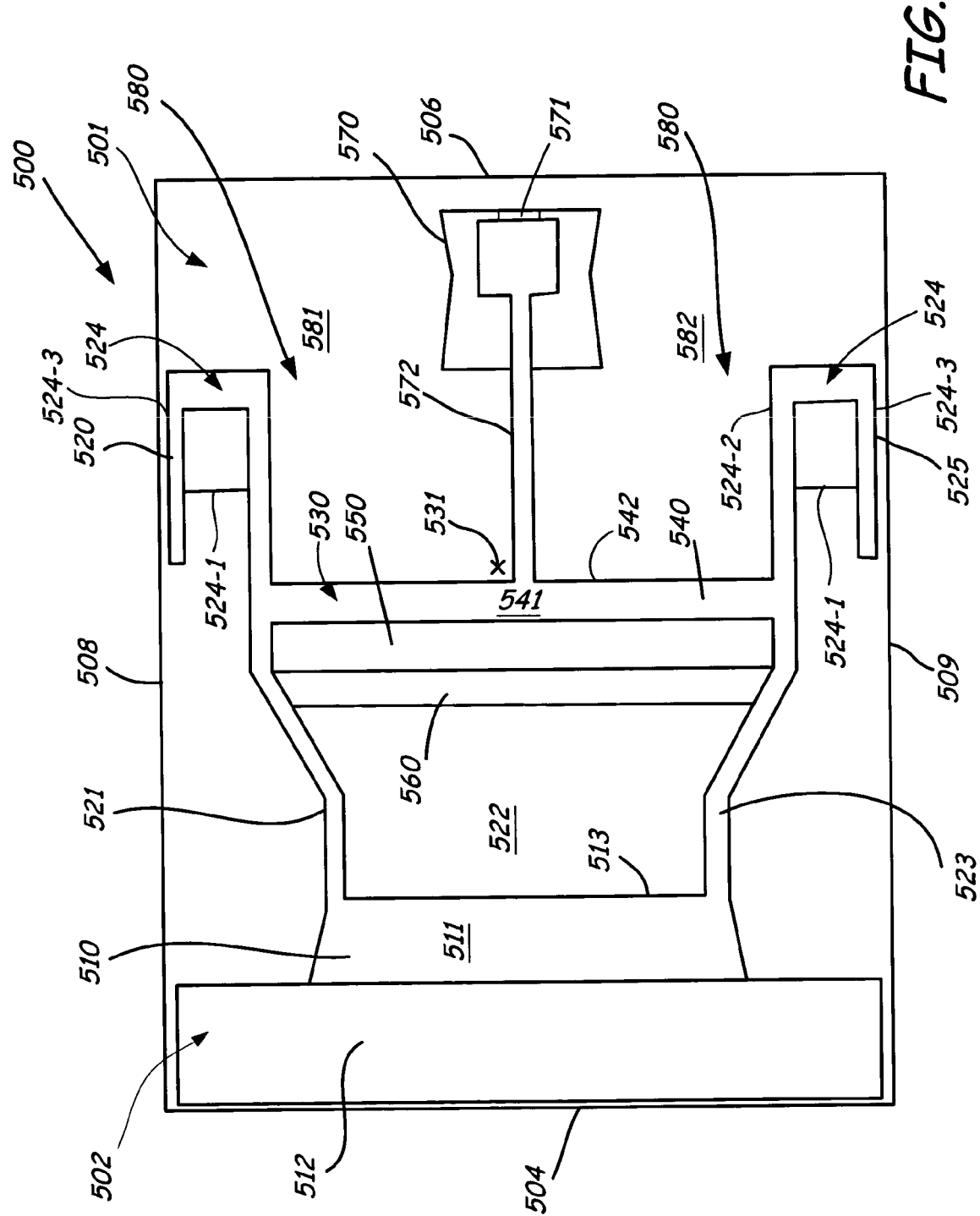
FIG. 5 is a bottom plan view of a slider according to another embodiment of the present invention.

FIG. 5 illustrates a slider 500 according to another embodiment of the present invention. Slider 500 includes a disc facing surface 501 and a bearing surface 502. Slider 500 also includes a step surface 512, a cavity dam 510, a center split pressurization feature 530, side rails 520 and 525 and a center pad 570. Slider 500 has a slider leading edge 504, slider trailing edge 506 and slider side edges 508 and 509.

Cavity dam 510 is located proximate to slider leading edge 504. A surface 511 of cavity dam 510 defines a portion of the bearing surface 502. Step surface 512 is located at slider leading edge 504 and in front of cavity dam 510. Step surface 512 is recessed from the bearing surface 502 by step depth. This step depth can be in the range of 0.1 microns to 0.5 microns. However, other depths can be used. In the embodiment illustrated in FIG. 5, step surface 512 significantly wider than the cavity dam 510. Subambient pressurization cavity 522 trails cavity dam 510 and is positioned between side arms 521 and 523. Side arms 521 and 523 extend from the trailing edge 513 of cavity dam 510 towards the center split feature 530. Arms 521 and 523 are bearing surfaces that are generally parallel with the top surface 511 of cavity dam 510. Subambient pressurization cavity 522 is recessed from the bearing surface by a cavity depth. In one embodiment this cavity depth is 5 microns. However, other cavity depths can be used.

Following cavity dam 522 is located center split pressurization feature 530. Center split pressurization feature 530 is located proximate the centroid 531 of slider 500. Center split feature 530 includes a first center split level 540, second center split level 550 and a third center split level 560. Third center split level 560 can comprise a portion of subambient pressurization cavity 522. The second center split level 550 is recessed from the bearing surface by a step depth. Further, second center split level 540 is bounded by the arms 521 and 523 and the first center split level 550. First center split level 540 includes a bearing surface or center split surface 541 is generally parallel to and at the same as bearing surface 502.

Side rail 520 includes a convergent channel feature 524. The convergent channel feature is isolated from the subambient pressurization cavity 580 and is open to recess area 521. Side rail 520 also includes a step portion 524-1 between side walls 524-2 and 524-3. Inside wall 524-2 separates the step surface 524-1 from the subambient pressurization cavity 580. In one embodiment in step portion 524-1 is recessed from the inside wall 524-2 by step depth of 0.1 to 0.5 microns. Similar features to those find in side rail 520 are present in side rail 525.

Connected to the trailing edge 542 of first center split level 540 is center rail 572. Center rail 572 separates or divides a second subambient pressurization cavity 580 into two separate cavities 581 and 582. Center rail 572 has a height that is generally parallel with and equal to the height of the upper surface of cavity dam 512 and of surface 541 of center split level 540. However, other heights for center rail 572 can be used. Center rail 572 extends along lateral center line 503, until center rail 572 connects with center paid 570.

Center pad 570 is located approximate to the trailing edge 506 of slider 500. Center pad 570 contains a read/write head or transducer 571, which can read data from or write data to tracks contained on disc surface 107.

FIG. 6 illustrates a slider 600 having a multiple center split feature arranged proximate to centroid 631. Slider 600 includes a disc facing side 601 a bearing surface 602. Slider 600 also includes a step surface 612, a cavity dam 610, a center split pressurization feature 630, side rails 620 and 625 and a center pad 670. Slider 600 also has a slider leading edge 604, slider trailing edge 606 and slider side edge 608 and 609.

Cavity dam 610 is located proximate to slider leading edge 604. A surface 611 of cavity dam 610 defines a portion of the bearing surface 602. Step surface 612 is located at slider leading edge 604 and in front of cavity dam 610. Step surface 612 is recessed from the bearing surface 602 by step depth. The step depth can range between 0.1 microns to 0.5 microns. However, other depths can be used. In the embodiment illustrated in FIG. 6 step surface 612 is significantly wider then the cavity dam 610. A subambient pressurization cavity 622 trails a cavity dam 610, and is bounded by side arm 621 and 623 and the center split pressurization feature 630. Side arm 621 and 623 extend from the trailing edge 613 of cavity dam 610 towards the center split pressurization feature 630. Arms 621 and 623 are bearing surfaces that are generally parallel with the top surface 611 of cavity dam 610. The subambient pressurization cavity 622 is recessed from the bearing surface by cavity depth. In one embodiment this cavity depth is 0.5 microns. However, other cavity depths can be used. Further, the shape of the subambient pressurization cavity 622 is shown illustratively in FIG. 6. However, those skilled in the art will recognize that other shapes can be used for cavity subambient pressurization cavity 622.

Following the subambient pressurization cavity 622 is the center split pressurization feature 630. Center split pressurization feature 630 is located proximate the centroid 631 of slider 600. Center split pressurization feature 630 includes a first center split level 640, a second center split level 650 and a third center split level 660. The third center split level 660 is in one embodiment a portion of subambient pressurization cavity 622. In this embodiment the third center split level 660 is recessed to the cavity depth. However, other depths can be used.

The second center split level 650 is recessed from the bearing surface by step depth, second center split level 640 may be recessed by other depths. Second center split level 640 is also bounded by arm 621 and 623 and the first center split level 650. Further, second center split level 640 is divided into three separate center split features indicated by reference numbers 640-1, 640-2 and 640-3. Second center split feature 640-1 is bounded by arm 621 and arm 653 of the first center split level. Second center split level 640-2 is bounded by arm 653 and 654 of the first center split level as well as a portion of center split level 650. Second center split level 640-3 is bounded by arm 654, arm 623 and a portion of first center split level 650. First center split level 650 includes a bearing surface or a center split level surface 651 and is generally parallel to and at the same level as the bearing surface 602. The multiple center split levels 640-1, 640-2, 640-3 of the second center split level 640 provide an increase in pressurization over the center split level 630 by concentrating the air flow from subambient pressurization cavity 622 over portions of the center split pressurization feature 630. While two arms are illustrated dividing the second center split level into these discrete regions those skilled in the art will recognize that the second center split level can be divided into fewer or greater numbers of regions by the use of differing number of arms.

A center pad 670 is located proximate to the trailing edge 606 of slider 600. Center pad 670 contains a read/write head or transducer 671, which can read data from or write data to track contained on the disc surface 107. Further center pad 670 can be shaped or formed to have an increase pressurization feature such as the one illustrated by element 673.

Figure 7A:
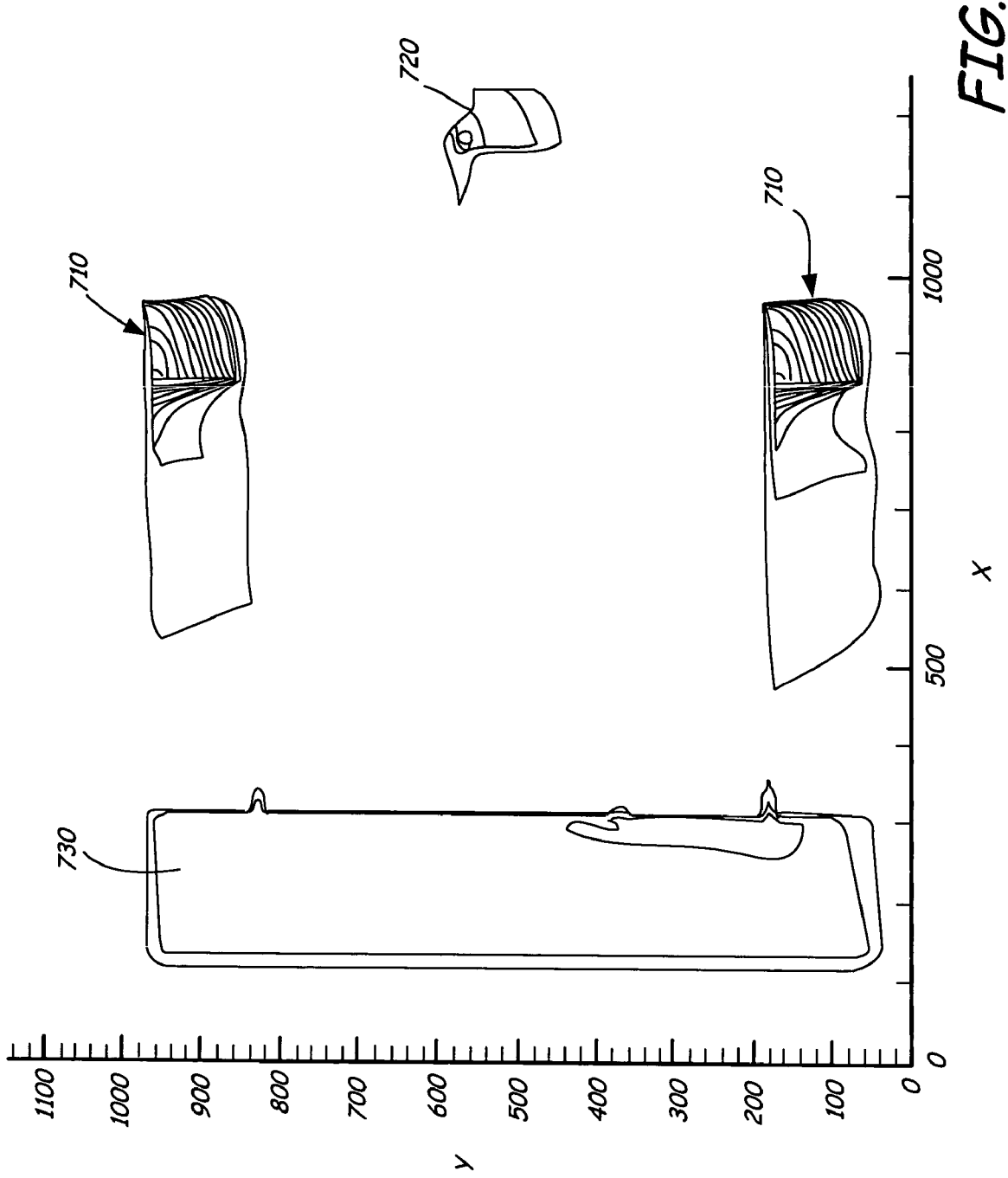
Figure 7B:
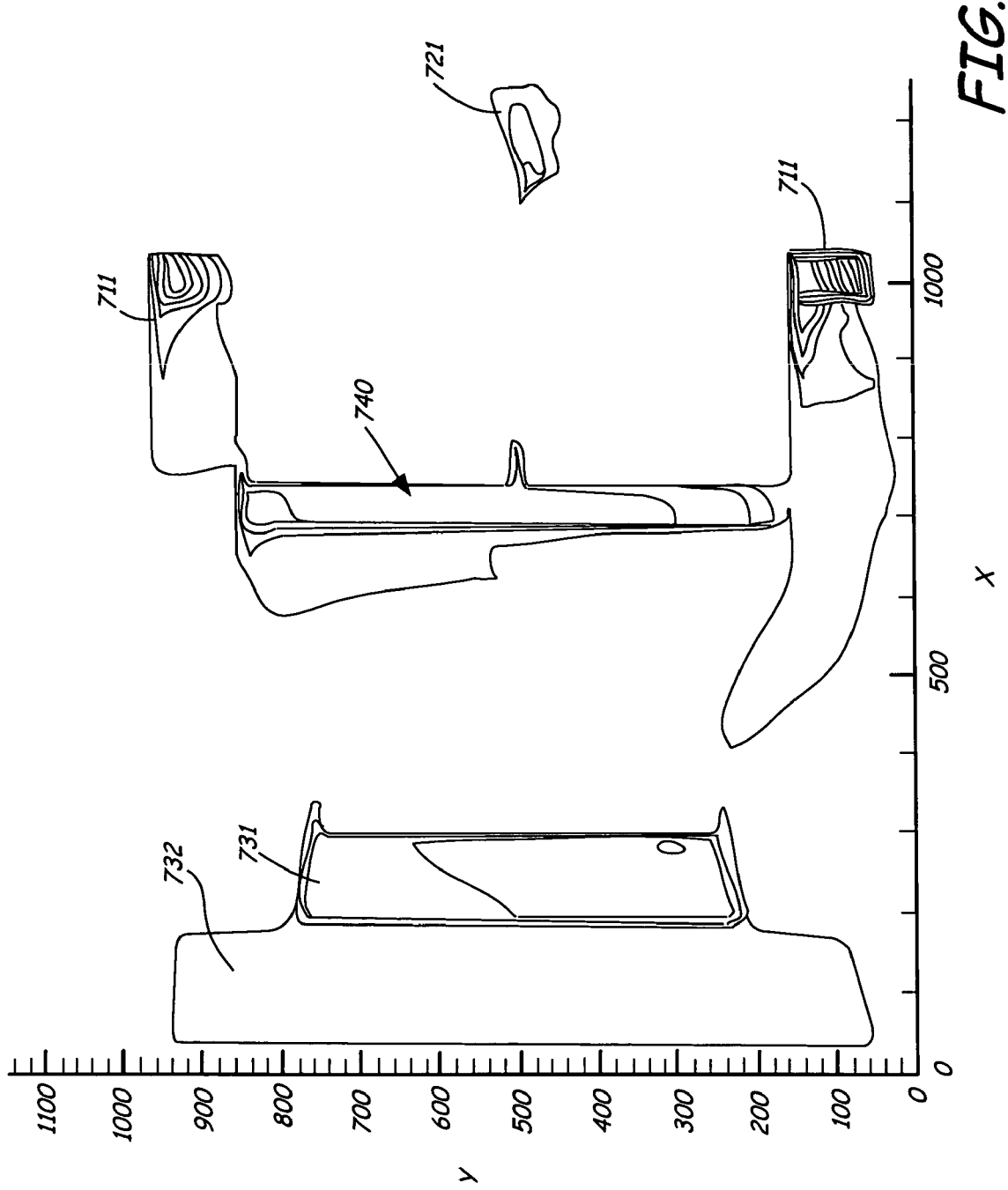

FIGS. 7A-7C illustrate pressurization contours for different air bearing surfaces according to illustrative embodiments of the present invention. The pressurization contours or areas represent pressurization over a portion or feature of the associated air bearing surface. In particular the contour lines represent areas of different pressurization values with areas of low relative pressurization indicated by reference number 701 and areas of high relative pressurization indicated by reference number 702. The contour lines between areas 701 and 702 represent increases in pressurization at incrementally increasing values.

FIG. 7A is a pressurization profile illustrating the pressurization of a PRIOR ART slider similar to the slider illustrated in FIG. 2. However, unlike the slider illustrated in FIG. 2 the slider illustrated in FIG. 7A lacks the center split feature. Pressurization area 710 illustrates the pressurization variance as air flows over the side rails. Pressurization area 720 illustrates the pressurization as air flows over the center pad. Pressurization area 730 illustrates the pressurization as air flows over the cavity dam and step surface. It should be noted that the area around centroid 705 is an area of relatively low pressurization compared to the pressurization at side rails 710.

FIG. 7B illustrates a pressurization profile over the slider 200 illustrated in FIG. 2. Pressurization area 711 illustrates the pressurization variance as air flows over the side rails 230 and 235. Pressurization area 721 illustrates the pressurization as air flows over the center pad 250. Pressurization area 731 illustrates the pressurization as air flows over the cavity dam 214 and step surface 220. Area 740 illustrates the pressurization over the center split feature 270. It should be noted that the pressurization at centroid 706 is significantly higher than the pressurization at the centroid 705 of FIG. 7A without a significant reduction in the pressurization at the side rails. This increase in pressurization at the centroid 706 over the center split feature 740 assists in maintaining a more stable fly height characteristic when the ambient air pressure is reduced. This is because the overall positive pressure on the slider is increased thereby reducing the effects of reduced ambient air pressure. Further, having the center split feature located about the centroid reduces the effects of the change in pressure on flying characteristics such as flying angle.

FIG. 7C illustrates a pressurization profile over the slider 600 illustrated in FIG. 6. Pressurization area 734 represents the pressurization over the step surface 612. Pressurization area 733 represents the pressurization over the cavity dam 610. Pressurization areas 741, 742 and 743 represent the pressurization over the center split areas 640-1, 640-2, and 640-3 respectively. It should be noted that the pressurization over the center split features 640-1, 640-2, and 640-3 is greater than the pressurization over the center split feature 270 in FIG. 7B. This is caused by the multiple center split features channeling the air flow from the subambient pressurization cavity 622 over the feature, and also provides additional roll stability to the slider with out the use of side rails.

In conclusion one embodiment of the present invention is directed to an air bearing surface (202, 402, 502, 602) on a slider (110, 200, 300, 400, 500, 600) having a center split pressurization feature (270, 330, 430, 530, 630) which minimizes the effects of altitude or change in ambient air pressure on the flying characteristics of the slider (110, 200, 300, 400, 500, 600). The slider (110, 200, 300, 400, 500, 600) includes a leading edge (204, 311, 404, 504, 604), a trailing edge (206, 312, 406, 506, 606), an air bearing surface (202, 402, 502, 602) and a centroid (271, 317, 431, 531, 631). A center pad (250, 370, 470, 570, 670) supporting a transducer (256, 371, 431, 531, 631) is located proximate the trailing edge (206, 312, 406, 506, 606). The air bearing surface (202, 402, 502, 602) is divided into a series of levels including an ABS level, a first recessed level and a second recessed level. The first recessed level is recessed below the ABS level. The second recessed level is recessed below the first recessed level. The ABS surface (202, 402, 502, 602) also can include a cavity dam (214, 320, 410, 510, 610) disposed proximate to the leading edge (204, 311, 404, 504, 604) of the slider. The cavity dam (214, 320, 410, 510, 610) includes a disc facing surface that is raised above the first recessed level. Following the cavity dam is a subambient pressurization cavity (242, 326, 422, 522, 622). After the cavity dam (214, 320, 410, 510, 610) and the subambient pressurization cavity (242, 326, 422, 522, 622) is the center split feature (270, 330, 430, 530, 630). In other embodiments the air bearing surface (202, 402, 502, 602) can include additional pressurization features such as side rails (230, 235, 420, 425, 520, 525) or a center rail (472, 572).

The center split feature (270, 330, 430, 530, 630) is located proximate the centroid (271, 317, 431, 531, 631) of the slider body and the air bearing surface (202, 402, 502, 602). The center split feature (270, 330, 430, 530, 630) has, at least, three levels including a first center split level (272, 340, 440, 540, 640), a second center split level (274, 350, 450, 550, 650), and a third center split level (276, 360, 460, 560, 660). The first center split level (272, 340, 440, 540, 640) is at the same level as the ABS level and is located closest to the centroid (271, 317, 431, 531, 631). The second center split level (274, 350, 450, 550, 650) is located forward of, in the direction of air flow (203, 301), the first center split level (272, 340, 440, 540, 640). The second center split level (274, 350, 450, 550, 650) is also recessed from the first center split level (272, 340, 440, 540, 640) to the same level as the first recessed level. The third center split level (276, 360, 460, 560, 660) is located forward of the second center split level (274, 350, 450, 550, 650) and is recessed from the second center split level. In some embodiments the third center split level (276, 360, 460, 560, 660) is recessed to the second recessed level, which is the same depth as the subambient pressurization cavity (242, 326, 422, 522, 622). Further embodiments of the center split feature (270, 330, 430, 530, 630) can include dividing the center split feature (270, 330, 430, 530, 630) into multiple center split features by, for example, dividing the second center split level (274, 350, 450, 550, 650) with arms (653, 654).

A second embodiment of the present invention is directed towards a disc drive (100). The disc drive (100) has a data storage disc (107), a suspension (112), and a slider (110, 200, 300, 400, 500, 600). The slider (110, 200, 300, 400, 500, 600) is supported by the suspension (112) and has a slider body, a leading slider edge (204, 311, 404, 504, 604), a trailing slider edge (206, 312, 406, 506, 606), a recessed area (242, 326, 422, 522, 622), and a positive pressurization area are formed on the media opposing face. The slider (110, 200, 300, 400, 500, 600) also includes an air bearing surface (202, 402, 502, 602) disposed on the disc opposing face that includes a center split feature (270, 330, 430, 530, 630) disposed proximate a centroid (271, 317, 431, 531, 631) of the slider body. The center split feature (270, 330, 430, 530, 630) includes a first center split level (272, 340, 440, 540, 640), a second center split level (274, 350, 450, 550, 650) recessed from the first center split level (272, 340, 440, 540, 640), and a third center split level (276, 360, 460, 560, 660) recessed from the second center split level. The first (272, 340, 440, 540, 640), second (274, 350, 450, 550, 650) and third (276, 360, 460, 560, 660) center split levels form a step like pattern. The levels are arranged such that air flowing over the center split feature (270, 330, 430, 530, 630) flows over the third (276, 360, 460, 560, 660), second (274, 350, 450, 550, 650) and first center split levels (272, 340, 440, 540, 640) in that order.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the disc head slider system while maintaining substantially the same functionality without departing from the scope and spirit of the present invention. In addition, although the preferred embodiment described herein is directed to a subambient pressure slider system for a disc drive, it will be appreciated by those skilled in the art that the teachings of the present invention can be applied to other types of sliders, without departing from the scope and spirit of the present invention.

What is claimed is:

1. A slider comprising:
 a leading edge;
 a trailing edge;
 a bearing surface;
 a transducer; and
 a center split feature separate from and forward of the transducer and disposed proximate a centroid of the slider, the center split feature comprising:

a first center split surface that is substantially level with the bearing surface;

a second center split surface disposed forward of the first center split surface and recessed from the bearing surface; and a third center split surface disposed forward of the second center split surface and recessed from the second center split surface;

wherein the first, second and third center split surfaces form a step like pattern, and are disposed such that fluid flowing over the bearing surface flows over the third, second and first center split surfaces respectively.

2. The slider of claim 1 wherein the second center split surface is recessed between about 0.15 microns and about 0.3 microns.

3. The slider of claim 1 wherein the third center split surface is recessed between about 2 microns and about 5 microns.

4. The slider of claim 1 further comprising:
a cavity dam disposed proximate to the leading edge, the cavity dam having a media facing surface that is raised above the second center split surface; and
a subambient pressurization cavity disposed between the cavity dam and the center split feature.

5. The slider of claim 4 further comprising:
a first side rail disposed along a first side of the slider;
a second side rail disposed along a second side of the slider.

6. The slider of claim 5 wherein the first and second rails are continuous with the center split feature.

7. The slider of claim 4 wherein the first center split surface is connected to the cavity dam and the first center surface surrounds the subambient pressurization cavity.

8. The slider of claim 4 wherein a portion of the subambient pressurization cavity includes the third center split surface.

9. The slider of claim 4 wherein the center split feature further includes:
a pair of arms extending from the center split feature towards the cavity dam, each arm coupled to a side edge of the center split feature;
wherein the pair of arms define side edges of the subambient pressurization cavity.

10. The slider of claim 9 wherein the pair of arms connect the center split feature with the cavity dam.

11. The slider of claim 10 wherein a top surface of the pair of arms is substantially level with the second center split surface.

12. The slider of claim 10 wherein a top surface of the pair of arms is at the bearing surface.

13. The slider of claim 9 further comprising:
a plurality of arms extending from the first center split feature towards the cavity dam, the plurality of arms spaced apart from each other and arranged about the centroid; and
wherein the plurality of arms divide the second center split surface into a plurality of discrete areas.

14. The slider of claim 13 wherein the plurality of arms divide the third center split surface into a plurality of discrete areas.

15. A slider supporting a transducer comprising:
a slider body having a media opposing face with a leading edge and a trailing edge relative to a direction of rotation of a media surface;
a bearing surface disposed on the media opposing face, comprising:
a center split feature disposed proximate a centroid of the slider body, the center split feature comprising:
a first center split surface having a portion proximate the centroid;
a second center split surface recessed from the first center split surface; and
a third center split surface recessed from the second center split surface;
wherein the first, second and third center split levels form a step like pattern, and are disposed such that fluid flowing over the center split feature flows over the third, second and first center split surface respectively.

16. The slider of claim 15 wherein the slider body further comprises:
a cavity dam proximate to the leading edge;
a first side rail disposed along a first side of the slider body;
a second side rail disposed along a second side of the slider body; and
a subambient pressurization cavity disposed between the cavity dam and the center split feature.

17. The slider of claim 16 wherein the slider body further comprises:
a second sub ambient pressurization cavity, the second subambient pressurization cavity following, in the direction of fluid flow, the center split feature.

18. The slider of claim 17 wherein the second sub ambient pressurization cavity is divided into two separate cavities by a center rail feature.

19. A bearing surface of a slider having a leading edge and a trailing edge, the hearing surface comprising:
a center split feature disposed proximate a centroid of the slider surface, the center split feature comprising at least three center split levels, the center split levels having a first center split surface substantially level with the hearing surface, wherein the first center split surface has at least a portion positioned between the centroid and the leading edge;
a cavity dam disposed forward of the center split feature relative to a fluid flow, the cavity dam having a first portion proximate a first side edge of the slider and a second portion proximate a second side edge of the slider, wherein the cavity dam extends continuously between the first and second portions; and
wherein the at least three center split levels form a step like pattern, and are disposed such that the fluid flowing over the bearing surface flows over each of the at least three center split levels respectively.

20. The bearing surface of claim 19 wherein the center split feature further includes:
a pair of arms extending from the center split feature towards the cavity dam, each arm coupled to a side edge of the center split feature;
wherein the pair of arms define side edges of a subembient pressurization cavity.

* * * * *

UNITED STATES PATENT AND TRADEMARK OFFICE
CERTIFICATE OF CORRECTION

PATENT NO.        : 7,245,455 B2                            Page 1 of 1
APPLICATION NO.   : 10/625788
DATED             : July 17, 2007
INVENTOR(S)       : Rajashankar Rajakumar It is certified that error appears in the above-identified patent and that said Letters Patent is hereby corrected as shown below:

In The Claims

In claim 19, column 16, line 37, delete "hearing" and insert therefor --bearing--.

In claim 19, column 16, line 42, delete "hearing" and insert therefor --bearing--.

Signed and Sealed this
Twenty-sixth Day of April, 2016

Michelle K. Lee
*Director of the United States Patent and Trademark Office*